Jan. 24, 1956   V. O. HAUSWIRTH   2,731,783
BALER PICKUP AND FEEDING MECHANISM
Filed Sept. 18, 1952   3 Sheets-Sheet 1
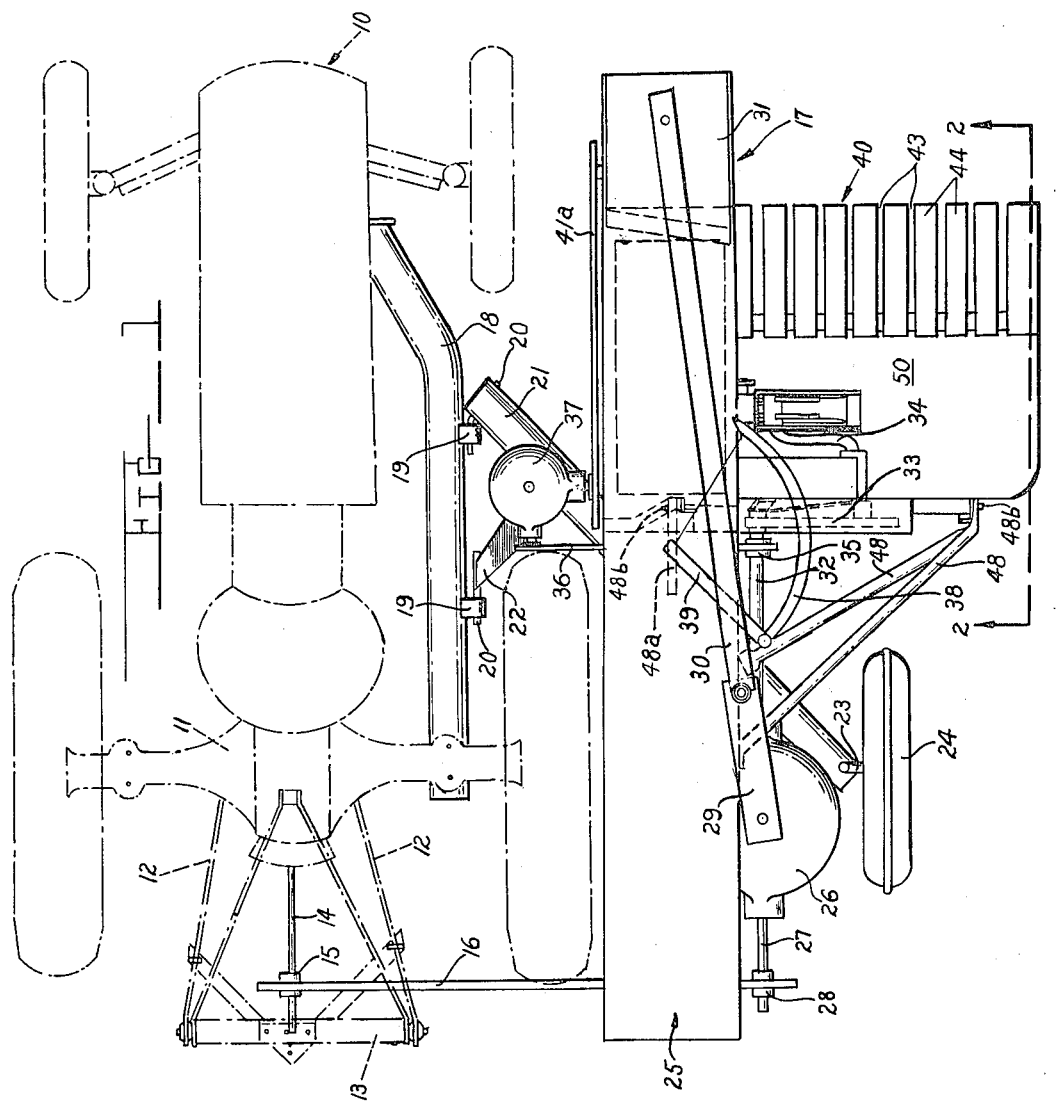
INVENTOR.
VERNON O. HAUSWIRTH
BY
*W. A. Schaich*
AND *H. P. Settle, Jr.*
ATTORNEYS

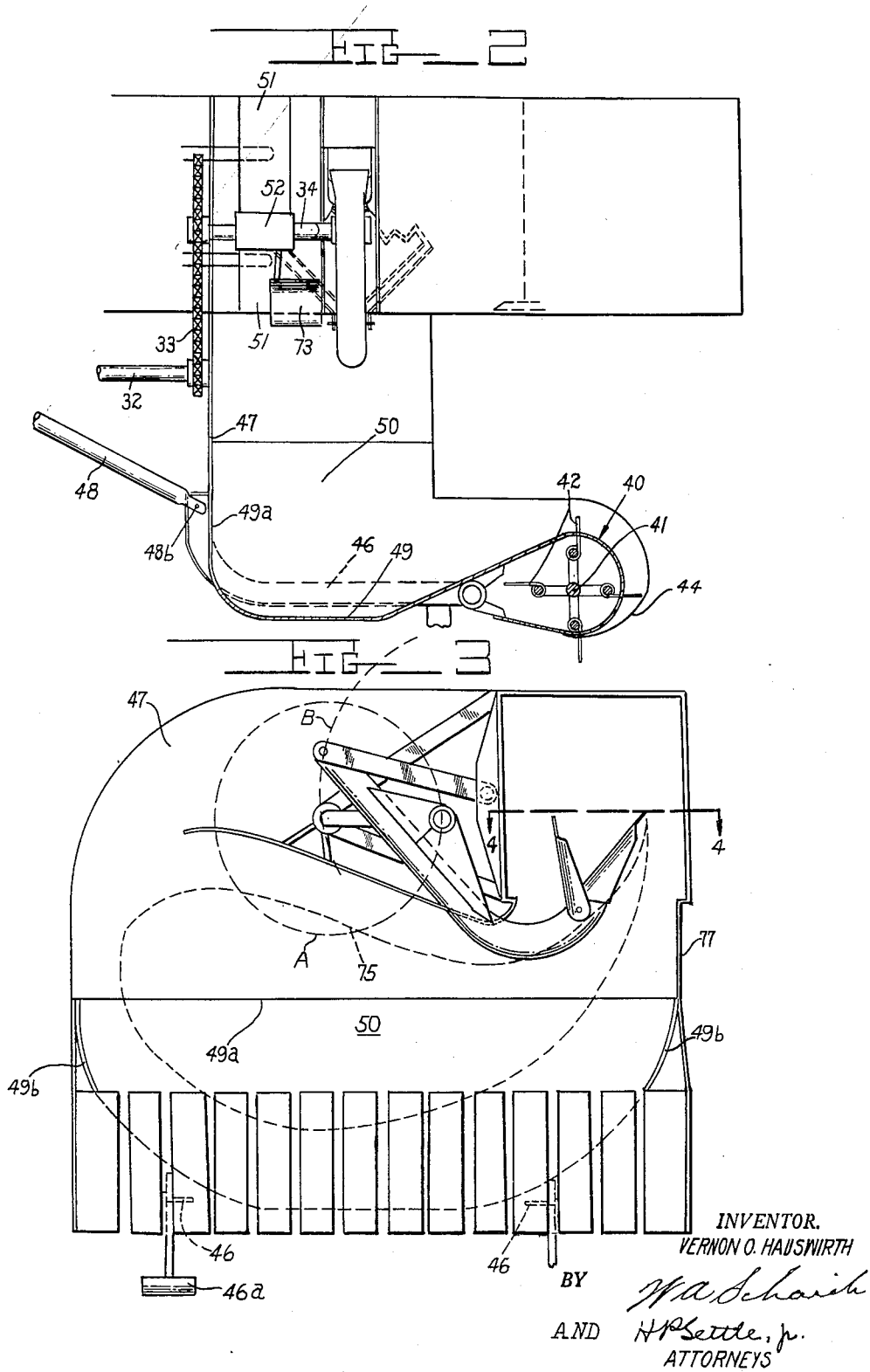

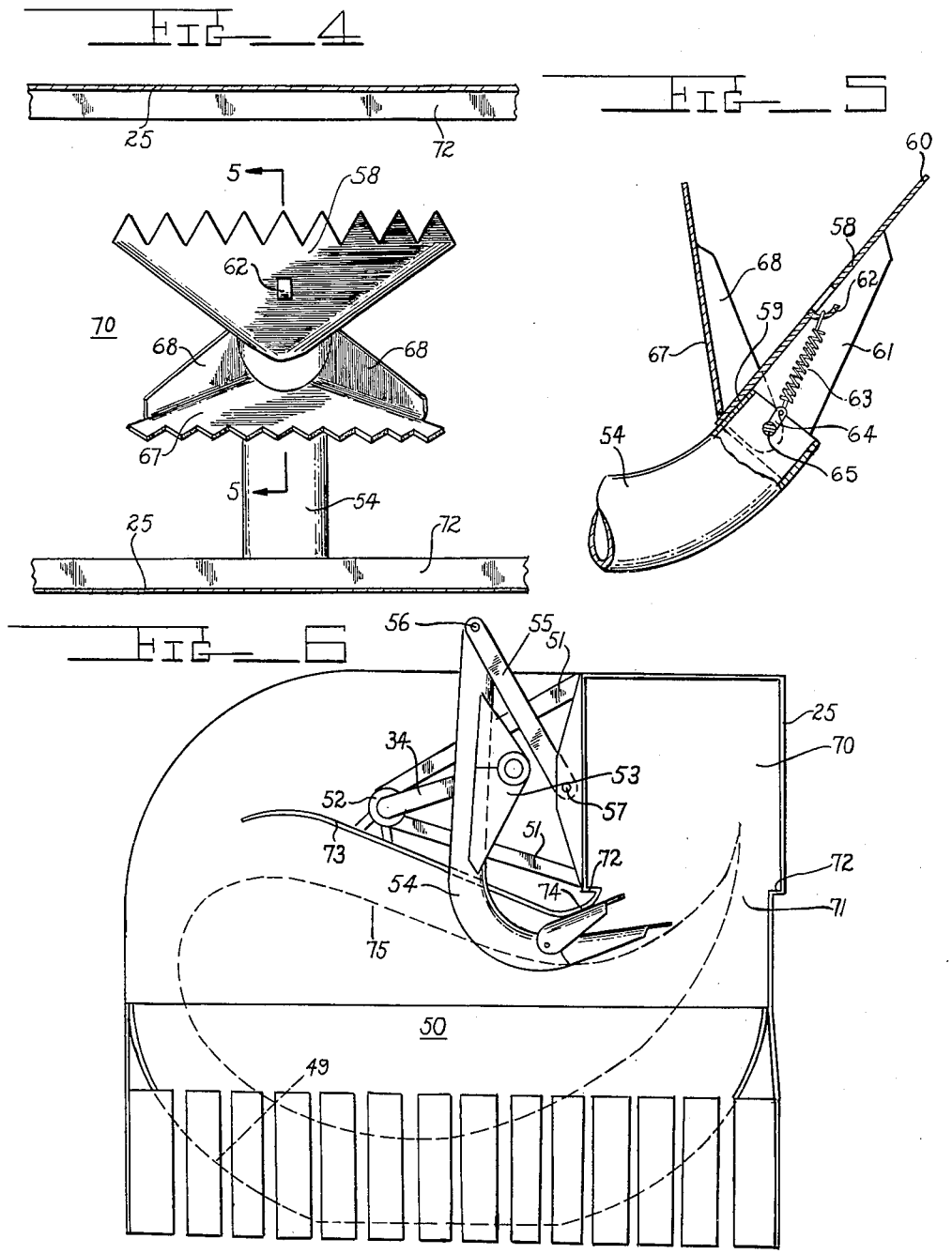

2,731,783
Patented Jan. 24, 1956

UNITED STATES PATENT OFFICE 2,731,783

BALER PICKUP AND FEEDING MECHANISM

Vernon O. Hauswirth, Royal Oak, Mich., assignor, by mesne assignments, to Ford Motor Company, Dearborn, Mich., a corporation of Delaware Application September 18, 1952, Serial No. 310,231

8 Claims. (Cl. 56—343)

The present invention relates to a baler pickup and feeding mechanism and more particularly, to a hay feeding mechanism for a pickup-type baler having a baling chamber overlying the pickup mechanism.

The present invention provides a new and novel type of pickup for a hay baler, the term "hay" being used generically to denote hay, straw, crop residues, and the like materials normally baled by a pickup-type machine.

More particularly, the present invention contemplates the provision of a baler having a pickup mechanism for elevating hay from a windrow or the like to a gathering or accumulating space from which the hay is moved into a baling chamber overlying at least a portion of the pickup mechanism. The hay enters the baling chamber through an opening in the bottom thereof and is retained in the chamber for compaction by means of a baling plunger or ram, after which the baled hay is tied under compression by means of needles swingable across the baling chamber after sufficient hay has been accumulated therein to form a complete bale.

The specific feeding mechanism of the present invention includes a feed arm pivotally mounted upon the baler so as to sweep laterally across the hay accumulating space provided immediately behind the pickup, the feed arm being movable upwardly at the end of its lateral stroke to enter the baling chamber through the bottom wall thereof. The entry of the feeding arm into the chamber stuffs and compresses the hay carried thereby into the chamber with later retraction of the arm leaving the hay therebehind to be subjected to baling pressure upon the next compression stroke of the ram. The hay is retained within the baling chamber upon longitudinally extending ledges or projections which also serve to define the reduced opening in the chamber bottom wall, and the feed arm is provided with a fork end which is open during the hay feeding and stuffing cycle, but collapsible upon retraction of the arm from the chamber to prevent the dragging of hay therefrom.

It is, therefore, an important object of the present invention to provide a pickup baler having a baling chamber provided with an open bottom and a feed arm effective to stuff hay into the chamber through the open bottom thereof.

Another object of the present invention is the provision of an improved baler having a baling chamber overlying a pickup mechanism and a feed fork arrangement for laterally sweeping hay from the pickup mechanism toward the baling chamber and for stuffing the accumulated hay upwardly into the chamber for later compaction and tying.

It is a further object to provide a pickup baler wherein hay within an accumulating area is elevated into a baling chamber by a feed arm having a terminal collapsible feeding fork which is spread to stuff hay into the chamber and automatically collapsed to accommodate retraction of the fork from the chamber.

Still another important object is the provision of a hay baler wherein hay is fed from a laterally extended pickup into a superimposed baling chamber by a laterally reciprocable feeding arm projecting upwardly into the baling chamber at the end of its feeding stroke and removable downwardly from the chamber after depositing hay therein.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of a baler of the present invention mounted upon a suitable prime mover, such as the illustrated tractor;

Figure 2 is an enlarged fragmentary sectional view taken along the plane 2—2 of Figure 1 to further illustrate the pickup and feed arm of the baler of Figure 1;

Figure 3 is a front elevational view of the baler further illustrating the feed arm and the oscillating movement thereof;

Figure 4 is an enlarged fragmentary sectional view taken along the plane 4—4 of Figure 3;

Figure 5 is a sectional view, with parts shown in elevation, taken along the plane 5—5 of Figure 4; and Figure 6 is a view similar to Figure 3 illustrating an adjusted position of the feed arm during retraction of the arm from the baling chamber.

As shown on the drawings:

In Figure 1, reference numeral 10 refers generally to a well-known type of tractor provided with a rear axle housing 11 carrying rearwardly extending draft links 12 joined at their trailing ends by a drawbar 13. The tractor power-take-off shaft extension 14 is drivingly connected to a sheave 15 carried by the drawbar 13 and lapped by a drive belt 16 extending laterally beyond the tractor for supplying power to a pickup baler, indicated generally at 17.

The baler 17 is supported upon the tractor 10 by a tubular frame element 18 extending longitudinally at the tractor and joined thereto in spaced points.

To explain in greater detail, the frame element 18 carries a pair of sleeves 19 receiving pivot pins 20 therethrough, the pins being carried by a secondary laterally and rearwardly extending frame element 21 and a frame element extension 22, respectively. The free end of the secondary frame element 21 carries an axle 23 upon which is disposed a ground-engaging wheel 24 bearing a portion of the weight of the baler 17.

The baler 17 comprises a longitudinally extending bale case 25 lying generally parallel to the path of travel of the tractor 10 and supported upon the secondary frame element 21. The bale case on one side thereof carries a gear housing 26 containing a gear set driven by a shaft 27 which in turn is driven through a sheave 28 lapped by the belt 16. The gear set within the housing 26 rotatably drives a crank arm 29 connected through a pitman arm 30 to a baling ram 31 slidably journalled by the bale case 25 at the forward end thereof for longitudinal movement. An output shaft 32 from the gear housing 26 is drivingly connected, as by a chain 33 lapping a sprocket on the shaft 32, to a feed arm crank 34, as will be hereinafter more fully described.

Upon the output shaft 32, there is also carried a sheave 35 lapped by a belt or chain 36 for driving a knotting mechanism including a gear box 37 associated with a pair of oscillatable tying needles 38 pivotally mounted on the bale case through a pivot arm 39. A windrow pickup 40 is provided to extend laterally of the bale case 25 at the forward end thereof, the pickup being best illustrated in Figure 2, and including a laterally extending shaft 41 driven by a belt 41a extending forwardly from the knotting mechanism 37, the shaft 41 having a plurality of radially extending fingers 42 rotatable within slots 43 formed in a pickup housing 44. The housing 44 is eccentric with respect to the pickup reel, so that hay is removed from the fingers 42 during passage of the fingers through the slots 43.

The pickup housing 44 is carried by a pair of forwardly extending support arms 46 pivotally mounted on braces 48 and 48a extending forwardly and downwardly from the rear portions of the bale case (Figure 1). The pivotal connections of the braces 48 and 48a to the support arms 46 is accomplished by pivot pins 48b, so that the pickup housing 44 is pivotally mounted for ground-following movement about a lateral axis defined by the pins 48b, with vertical movement of the housing being controlled by a ground-following shoe 46a carried by the outer arm 46 (Figure 3). To accommodate such vertical floating movement of the housing, the housing blends smoothly with a floor sheet 49 having an upturned rear portion 49a slightly overlapping the lower edge of backing plate 47 and freely movable vertically relative thereto. The lateral sides of the floor sheet 49 are curved upwardly, as at 49b, to define the side limits of the accumulation chamber 50 directly behind the pickup mechanism and generally beneath the bale case.

Immediately above the surface 49 and the hay accumulation chamber 50, the bale case carries a pair of laterally outwardly directed braces 51 which are joined at their outer extremities to a bearing 52 journaling the crank arm 34 and the free extremity of the crank arm 34 is pivotally connected through plates 53 to a medial portion of a feed arm 54. The feed arm 54 is pivoted to the bale case by a link 55 pivotally joined to one free end thereof, as at 56, with the other end of the link 55 being pivoted, as at 57, in fixed position to the side of the bale case 25.

The free end of the feed arm 54, i. e., that arm end remote from the point 56 of pivoted attachment to the link 55, is of arcuate configuration, as best illustrated in Figure 5. This free arcuate end of the feed arm 54 rigidly carries a feed plate 58 of generally triangular configuration having at one end a generally semi-cylindrical collar 59 secured to the free end of the arm 54 and having a free scalloped or serrated edge 60 which is elongated longitudinally of the bale case 25, as best shown in Figure 4. The feed plate 58 is reinforced by a pair of depending side flanges 61 terminating short of the free edge 60 thereof, and the plate 58 intermediate its length is provided with an integral depending tang 62 secured to one end of a coiled tension spring 63. The spring 63 is connected at its other end to an arm 64 rigidly connected to a pivot pin 65 extending laterally across the free end of the arm 54 to define a pivot axis for an auxiliary feed finger 67 of substantially the same configuration as the feed plate 58 and having depending marginal flanges 68 joined to the pin 65 on opposite sides of the arm 54.

The bale case 25 defines an interior baling chamber 70 located immediately above the pickup 40 and the accumulation chamber 50. The bale chamber is enclosed by the bale case while the bottom of that portion of the bale chamber defining the feed opening is open, as at 71. The bale case side walls terminate in inturned, laterally inwardly extending ledges 72 which are laterally spaced to accommodate therebetween the entry of the feed arm 54 and hay carried thereby. The inner ledge 72 carries a depending side plate 77 forming a continuation of the floor plate side 49b therebeneath to aid in guiding hay into the chamber. Directly overlying the chamber 50 and in substantial lateral alignment with the open bottom 71 of the baling chamber 70, there is provided a closure plate 73 forming a top for the accumulation chamber 50. One terminal edge of the plate 73 is joined to the adjacent ledge 72 so that the plate defines a cam surface 74 immediately adjacent the baling chamber positioned to contact the feed finger 67 during retraction of the feed arm 54.

Operation

In the operation of the pickup and feed means of the present invention, hay is elevated by the pickup reel 40 onto the surface 49 to accumulate within the space 50. The arm 54 is actuated by the driving means therefor, including the shaft 32, the chain 33, and the crank 34, with the free end 60 of the finger plate 58 moving through the path illustrated in dotted outline, as at 75, in Figures 3 and 6. Movement of the free end of the arm 54 is confined to the closed path 75, since the medial portion of the arm is limited to the circular path A by the crank arm 34, while the end 56 of the arm is limited to the semi-circular path B by the link 55.

During lateral movement of the arm 54 within its path 75 over the plate 49, hay is picked up by the feed finger plate 60 and the secondary or finger plate 67 with the plate 67 retained in its open position (Figure 5) by the spring 63 to aid in the accumulation of a charge of hay. The finger 67 is opened by means of the spring 63 with the arm 64 being aligned with the tang 62 to retain the finger 67 in open position and the resiliency of the spring 63 accommodating further movement of the plate to a still further opened position by overcenter movement of the arm 64. The finger is thus "cushioned" in its partially open position of Figure 5. When the arm 54 reaches the position illustrated in Figure 3, the hay carried by the feed plate 58 and the finger plate 67 is introduced into the baling chamber 70, and the hay is stuffed into the chamber by the upward terminal movement of the arm.

Further rotation of the crank shaft 35 will retract the arm 54 from the chamber 70 with such retracting movement bringing the finger plate 67 in contact with the cam surface 74 of the plate 73 to pivot the finger plate toward the feed plate 58, thereby collapsing the normally divergent plates to accommodate ready withdrawal of the arm from the chamber without the dragging of hay therefrom. The hay will be retained within the chamber 70 by engagement of the hay with the ledges 72, so that the hay within the chamber will be later compressed upon movement of the ram 31 into the baling chamber.

Thus, it will be appreciated that the present invention provides an improved hay pickup and feeding mechanism for a baler. The lateral movement of the feed arm, followed by the terminal upward movement thereof into the bale chamber, effectively conveys hay toward the chamber from the pickup, while the stuffing of the hay into the chamber insures retention of the hay upon the chamber ledges. Further, the collapsing of the arm terminal finger plate prevents dragging of hay from the chamber upon arm retraction. In addition, it will be noted that the path of travel of the arm closely parallels the curved floor plate.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a pickup baler having a laterally extending pickup reel, the improvement comprising means providing a hay accumulating space rearwardly of said reel, a bale case generally overlying said pickup and said accumulating space and having a baling chamber directly overlying said accumulating space adjacent one lateral extremity thereof, a feed arm pivoted to said bale case and depending therefrom, and means for actuating said arm for reciprocatory movement laterally across said space and upwardly into said baling chamber.

2. In a baler, a baling chamber provided with a bottom opening, a pair of laterally spaced inwardly projecting ledges extending along the sides of said opening, a feed arm insertable into and retractable through the bottom opening, and means for actuating said feed arm, said feed arm terminating in a feeding lip extending longitudinally of said baling chamber and enterable between said ledges to stuff hay into said baling chamber.

3. In a baler, a baling chamber provided with a bottom opening, a pair of laterally spaced, inwardly projecting ledges extending along the sides of said opening, a feed arm insertable into and retractable through the bottom opening, said feed arm terminating in a feeding lip extending longitudinally of said baling chamber and enterable between said ledges to stuff hay into said baling chamber, means for actuating said arm, an auxiliary arm section pivoted to said feed arm adjacent said feeding lip and defining an additional feeding lip, spring means connected to said auxiliary arm section to retain the feeding lips in spaced relation, thereby defining an enlarged feed arm end, and means for pivoting said auxiliary section against the action of said spring toward said arm feeding lip to facilitate the retraction of said feed arm from the baling chamber.

4. In a pickup baler having a laterally extending windrow pickup mechanism, the improvement comprising means providing an accumulation chamber immediately rearwardly of said pickup mechanism and substantially co-extensive therewith, a bale case overlying one lateral edge of said accumulation chamber and defining an open-bottomed baling chamber vertically aligned therewith, a depending pickup arm pivoted to said bale case and having an arcuate end portion carrying a terminal feed fork, means for reciprocating said arm for feed fork cyclic-movement laterally through said accumulation chamber toward said baling chamber and upwardly into said baling chamber to stuff hay thereinto followed by downward retraction from said baling chamber and return lateral movement, and means defining hay-supporting ledges extending longitudinally of said baling chamber to partially close the open bottom thereof to retain hay therein.

5. In a baler, means providing a hay accumulation space, a bale case providing an interior open-bottomed baling chamber overlying said accumulation space and laterally aligned therewith, a rotatable crank overlying said accumulation space, a hay feed arm on said crank depending toward said accumulation space and having an arcuate terminal portion directed toward said baling chamber, and a link pivotally connecting an opposite terminal end of said feed arm to said bale case for movement in an arcuate vertical path, said feed arm arcuate portion being movable laterally towards and away from said baling chamber upon rotation of said crank with said link guiding said feed arm arcuate portion into and out of the open bottom of said baling chamber when said crank and said link approach and pass through a position parallel to one another and said feed arm arcuate portion is directed toward said baling chamber.

6. In a pickup baler having a bale case defining an open-bottomed bale chamber overlying means providing a laterally extending hay accumulation chamber, a feeding arm positioned in lateral alignment with said bale chamber and having one end portion extending laterally toward said bale chamber, means supporting said arm in generally depending relation for oscillating movement laterally through accumulation chamber with said one end portion being moved towards and away from said bale chamber, said supporting means effecting substantially vertical movement of said one end of said arm when said arm is directed vertically toward said bale chamber, means for oscillating said arm to convey hay laterally of said accumulation chamber and vertically into said bale chamber, said supporting means effecting oscillating movement of said arm in a closed path laterally traversing said accumulating chamber and including a vertical reciprocatory movement of said arm end into and out of said bale chamber, an enlarged feeder plate fixed to said one end portion of said arm and enterable into said bale chamber through the open bottom thereof to stuff hay from the accumulation chamber into said bale chamber, and a finger plate attached to said feeder plate in outwardly divergent relation and of substantially the same size and configuration as said feeder plate to define an enlarged feeding terminal portion for said arm.

7. In a baler having means providing a hay accumulation space, a bale case having an interior open-bottomed baling chamber overlying said accumulation space and laterally aligned therewith, a rotatable crank arm overlying said accumulation space, a hay feed arm on said crank arm depending toward said accumulation chamber and having an arcuate terminal portion directed toward said baling chamber, means pivotly connecting an opposite terminal end of said feed arm to said bale case for movement in an arcuate vertical path, said feed arm arcuate portion being movable laterally towards and away from said baling chamber upon rotation of said crank arm with said last-named means guiding said crank arm arcuate portion into the open bottom of said baling chamber when said arm arcuate portion is substantially vertically aligned therewith, a feeder plate fixedly attached to the free end of said feed arm arcuate portion to form an extension thereof and of generally triangular configuration to define an enlarged arm feeding end, a finger plate of substantially the same configuration as said feeder plate and pivotally attached to said feed arm free end for movement towards and away from said feeder plate, and means biasing said finger plate about its point of attachment to said feeder arm to an open position at which the free ends of said plates are divergent to define an enlarged hay-engaging surface at the free end of said feed arm.

8. In a baler having means defining a hay accumulation space, a bale case defining an interior open-bottomed baling chamber overlying said accumulation space and laterally aligned therewith, a rotatable crank arm overlying said accumulation space, a hay feed arm on said crank arm depending toward said accumulation chamber and having an arcuate terminal portion directed toward said baling chamber and means pivotly connecting an opposite terminal end of said feed arm to said bale case for movement in an arcuate vertical path, said feed arm arcuate portion being movable laterally towards and away from said baling chamber upon rotation of said crank arm with said last-named means guiding said crank arm arcuate portion into the open bottom of said baling chamber when said arm arcuate portion is substantially vertically aligned therewith, a feeder plate fixedly attached to the free end of said feed arm arcuate portion to form an extension thereof and of generally triangular configuration to define an enlarged arm feeding end, a finger plate of substantially the same configuration as said feeder plate and pivotally attached to said feed arm free end for movement towards and away from said feeder plate, and means biasing said finger plate about its point of attachment to said feeder arm to an open position at which the free ends of said plates are divergent to define an enlarged hay-engaging surface at the free end of said feed arm, and means interposed in the path of retraction of said feed arm to engage said finger plate as the same is removed from said bale chamber to collapse said finger plate toward said feeder plate, thereby accommodating withdrawal of said feed arm without dragging hay from said baling chamber.

References Cited in the file of this patent

UNITED STATES PATENTS

| | | |
|---|---|---|
| 2,487,938 | Nikkel | Nov. 15, 1949 |
| 2,489,199 | Russell | Nov. 22, 1949 |
| 2,545,188 | Baskerville | Mar. 13, 1951 |
| 2,552,888 | Druetta | May 15, 1951 |
| 2,572,180 | Morrison | Oct. 23, 1951 |
| 2,633,691 | Lytle | Apr. 7, 1953 |
| 2,647,355 | Luke | Aug. 4, 1953 |

FOREIGN PATENTS

| | | |
|---|---|---|
| 169,494 | Austria | Nov. 26, 1951 |